United States Patent
Armstrong et al.

(10) Patent No.: US 7,506,075 B1
(45) Date of Patent: Mar. 17, 2009

(54) FAIR ELEVATOR SCHEDULING ALGORITHM FOR DIRECT ACCESS STORAGE DEVICE

(75) Inventors: Troy David Armstrong, Rochester, MN (US); Michael Steven Faunce, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 09/456,211

(22) Filed: Dec. 7, 1999

(51) Int. Cl.
  *G06F 3/00* (2006.01)
  *G06F 3/06* (2006.01)
(52) U.S. Cl. ............... 710/6; 710/5; 710/52; 710/54; 710/36; 710/40; 710/42; 710/44; 710/41
(58) Field of Classification Search ........ 710/6, 710/30, 5, 52, 54, 36, 40, 41, 44, 42; 709/224
  See application file for complete search history.

(56) References Cited

U.S. PATENT DOCUMENTS 5,644,786 A * 7/1997 Gallagher et al. ............ 710/30
5,931,912 A * 8/1999 Wu et al. ..................... 709/224

* cited by examiner

*Primary Examiner*—Kim Huynh
*Assistant Examiner*—Joshua Schneider
(74) *Attorney, Agent, or Firm*—Wood, Herron & Evans, L.L.P.

(57) ABSTRACT

An apparatus, program product and method of processing access requests for a direct access storage device utilize a "fair elevator" algorithm to schedule access requests from a plurality of requesters desiring access to a direct access storage device (DASD). In particular, a fair elevator algorithm arbitrates requests by taking into account both the requesters with which various requests are associated, as well as the relative positions of the data to be accessed on the DASD. By sorting access requests based upon both requester identity and DASD position, both multitasking performance and DASD throughput are improved in a balanced manner, thus improving overall system performance.

29 Claims, 4 Drawing Sheets

FAIR ELEVATOR SCHEDULING ALGORITHM FOR DIRECT ACCESS STORAGE DEVICE

FIELD OF THE INVENTION

The invention is generally related to computer access of a shared storage device, and in particular, to scheduling algorithms that arbitrate access between multiple requesters of a shared storage device.

BACKGROUND OF THE INVENTION

Access to data stored in a storage device can significantly impact the performance of a computer system incorporating such a device. In particular, in high performance or multi-user computer systems, often a relatively large direct access storage device (DASD), e.g., utilizing arrays of magnetic, optical or magneto-optical disk drives and the like, may need to be accessed on a frequent basis by multiple users and/or multiple computer software tasks. DASD's are typically much slower than the solid state memories of such computer systems. As such, the speed at which data can be transferred to or from a storage device can play a large part in the overall performance of a system.

Different users and/or different tasks that require access to a DASD (collectively referred to herein as "requesters") often operate concurrently with one another, and may attempt to access the DASD at the same time. As such, many computer systems employ scheduling algorithms to arbitrate access requests from multiple requesters in a computer system. However, in many instances, it is difficult for a scheduling algorithm to adequately balance the competing interests relating to the performance of the software executing on the computer system, and the performance of the DASD. Whenever these interests are not optimally balanced, overall system performance suffers.

Specifically, DASD performance is often directly impacted by the "seek time" of a DASD—that is, the time that it takes for a drive head in the DASD to reach the position on a storage medium of the information with which a particular request is associated. One scheduling algorithm that attempts to minimize seek times is referred to as an "elevator" algorithm, which orders requests based upon the relative positions of the data associated with the requests on the DASD. The ordering of the requests is selected so that a drive head can be moved back and forth between the two end positions of the DASD, with any I/O requests encountered along the way issued to the device. The seek time of the drive head on the DASD is thus minimized, thereby maximizing the performance of the DASD.

One potential problem with the elevator algorithm, however, is that if one requester issues a large amount of requests to a relatively narrow range of positions on a DASD, the requester may occupy a large amount of the bandwidth of the DASD. Doing so can effectively restrict access to the DASD for other requesters, thereby stalling the progress of those requesters and adversely impacting system performance.

In other computer systems, a different scheduling algorithm, often referred to as a "fair" algorithm, attempts to schedule requests in a round robin fashion according to the various identities of the requesters associated with the requests such that each requester in a system is able to use the DASD "fairly", and not unduly stall other requesters attempting to concurrently access the DASD. Multitasking performance is often optimized because multiple tasks are allowed to proceed with reduced delays in accessing a shared DASD. However, given that different requesters will often access data stored at different positions on a DASD, the fair algorithm can increase seek times, and thus degrade the performance of the DASD. As such, the fair algorithm is often an optimal solution for multitasking environments and when arbitrating between multiple requesters, but is not as efficient for DASD throughput.

While each of the elevator and fair scheduling algorithms can provide adequate performance in some situations, often the competing interests of ensuring adequate progress of multiple requesters, and minimizing seek times in a DASD, can limit the overall performance of a computer system. Therefore, a significant need continues to exist for a manner of scheduling requests from multiple requesters in a computer system to maximize system performance.

SUMMARY OF THE INVENTION

The invention addresses these and other problems associated with the prior art by providing an apparatus, program product and method of processing access requests for a direct access storage device that utilize a "fair elevator" algorithm to schedule access requests from a plurality of requesters desiring access to a DASD. In particular, a fair elevator algorithm consistent with the invention arbitrates requests by taking into account both the requesters with which various requests are associated, as well as the relative positions of the data to be accessed on the DASD. By sorting access requests based upon requester identity and DASD position, multitasking performance and DASD throughput are improved in a balanced manner, thus improving overall system performance.

Consistent with one aspect of the invention, a fair elevator algorithm sorts access requests in two stages. In a first stage, access requests are sorted based upon the requesters associated therewith to generate a first ordered set of access requests. Subsequently, at least a portion of the access requests in the first ordered set of access requests are sorted based upon the positions on the DASD associated therewith. Sorting the first ordered set of access requests creates a second ordered set of access requests, which may be issued in sequence to a DASD to thereby incorporate both requester identity and DASD position into the arbitration of access requests. Consistent with another aspect in the invention, the first and second ordered sets of access requests are stored in queues, with the first queue storing incoming access requests sorted based upon requester identity, and with the second queue receiving access requests from the first queue and sorted based upon the DASD positions associated therewith.

Among other advantages, in a multiprocessing or multitasking environment, issuing access requests from multiple tasks may be used to keep multiple processors as active as possible, whereby sorting access requests based upon requester identity maximizes multitasking performance when accessing a DASD. Moreover, grouping access requests that fall close together on a DASD minimizes seek time, and thus improves the response time of individual requests. Moreover, as will become more apparent below, in some embodiments in the invention, it may be desirable to utilize a tunable parameter to balance the relative contributions of requester identity and DASD position to operatively tune the performance of a scheduling algorithm to provide optimum performance for a particular computer environment.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
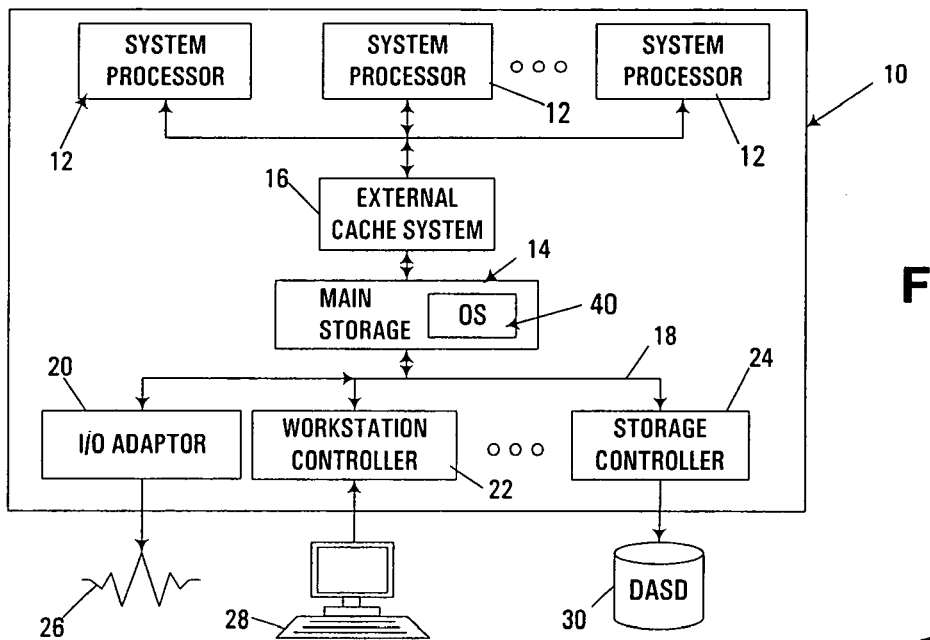
FIG. 1 is a block diagram of a multiprocessing computer system consistent with the invention.

Turning now to the Drawings, wherein like numbers denote like parts throughout the several views, FIG. 1 illustrates the general configuration of an exemplary computer system 10, or apparatus, suitable for implementing a fair elevator scheduling algorithm consistent with the invention. Computer system 10 generically represents, for example, any of a number of multi-user and/or multi-tasking computers such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other programmable electronic devices (e.g., incorporating embedded controllers and the like). For example, one suitable implementation of computer system 10 is in a midrange computer such as the AS/400 computer available from International Business Machines Corporation. Computer system 10 will hereinafter also be referred to as an "apparatus" or "computer", although it should be appreciated the term may also include other suitable electronic devices consistent with the invention.

Computer system 10 generally includes one or more system processors 12 coupled to a memory subsystem including main storage 14 and an external cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks 26, one or more workstations 28, and/or one or more storage devices such as a direct access storage device (DASD) 30.

Computer system 10 operates under the control of an operating system 40 (shown resident in main storage 14), and executes or otherwise relies upon various computer software applications, components, programs, objects, modules, data structures, etc. Moreover, various applications, components, programs, objects, modules, etc. may also execute on one or more processors in another computer coupled to computer system 10 via a network 26, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the operations necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
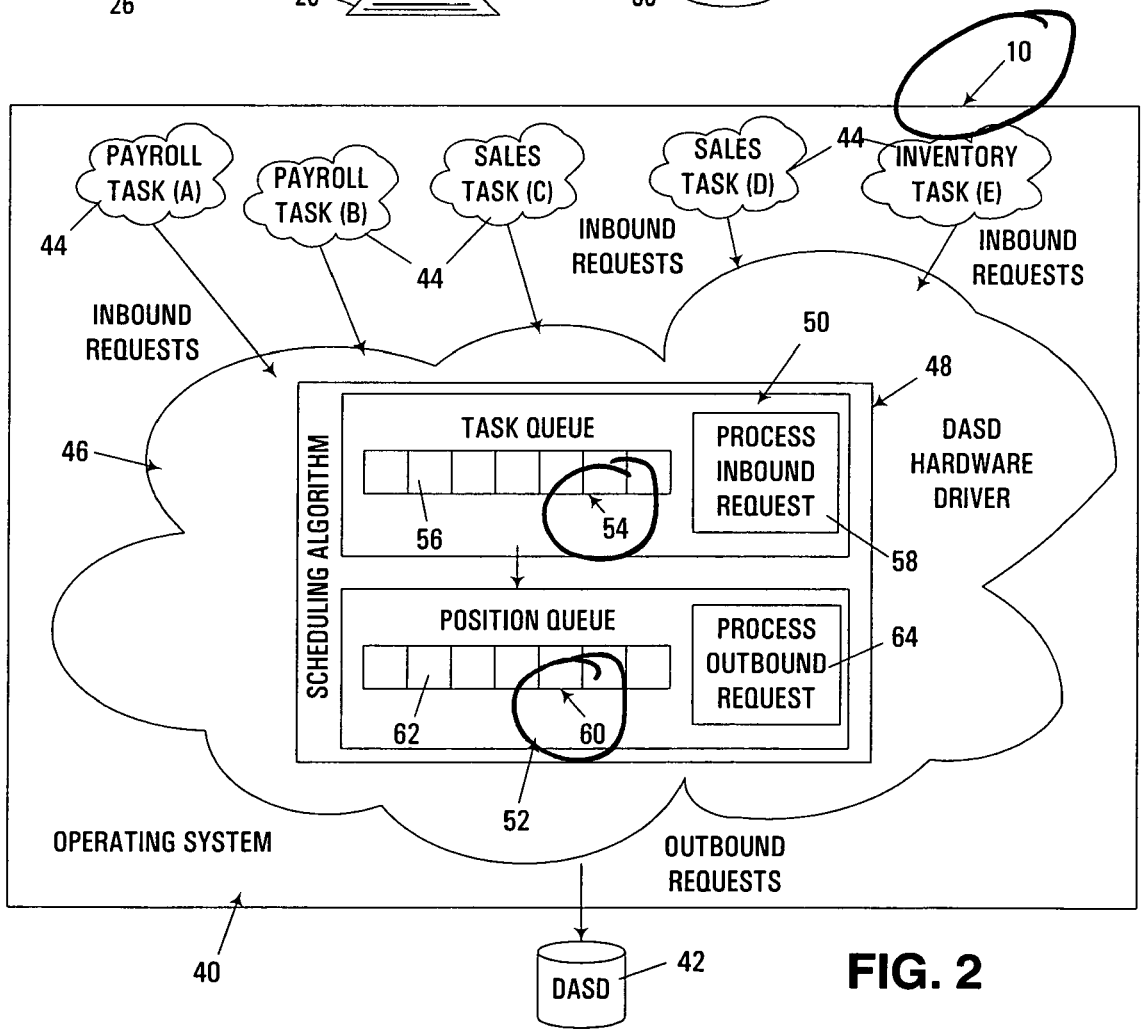
FIG. 2 is a block diagram of the primary software components in the computer system of FIG. 1, implementing a fair elevator scheduling algorithm consistent with the invention.

FIG. 2 illustrates the principal software components suitable for implementing a fair elevator scheduling algorithm consistent with the invention in computer system 10. In particular, operating system 40 is illustrated as interfaced with a DASD 42 to be accessed by a plurality of requesters, here represented by a plurality of tasks 44. Each task 44 is capable of issuing an access request for DASD 42, which is input to a DASD hardware driver 46, sorted based upon a scheduling algorithm 48, and issued in a predetermined sequence to DASD 42 to provide read and/or write access to the DASD.

As used herein, a requester may incorporate any software component capable of accessing a DASD, be it any of multiple computer programs executing on one or more microprocessors, any of one or more computer users attempting to access a shared DASD (each of which may be represented by a separate task in the computer system), any of multiple computers or other devices coupled to a shared DASD or a combination of the above. In general, practically any program code capable of issuing access requests to a DASD in a computer system can operate as a requester in the context of the invention.

A DASD 42 (which may for the purpose of FIG. 2 be considered to logically incorporate both the storage controller 24 and physical device 30 of FIG. 1) may be represented by any form of accessible storage that is capable of being accessed by multiple sources. DASD 42 can incorporate control and drive electronics, and may include an array of multiple physical devices controlled by a central controller. It will be appreciated that, depending upon the storage medium for the DASD, the "position" with which a request is associated may refer to any number of physical locations on the device, including, for example, a logical block address (LBA), an addressable cell, a track number, a head number, a cylinder number, a platter number, and/or a record number, among others.

Likewise, as far as identifying a requester with which an access request is associated, a requester identification may be based upon a specific task identifier, a processor identifier (e.g., so that all requests handled by a given microprocessor are grouped together, irrespective of which task a particular request is associated), a process identifier, a job identifier, a thread identifier, etc. Other modifications will be apparent to one of ordinary skill in the art.

DASD hardware driver 46 implements a fair elevator scheduling algorithm 48 incorporating a front end 50 for processing inbound requests and a back end 52 configured to issue outbound requests to DASD 42.

Front end 50 incorporates a task queue 54 including a plurality of entries 56 for storing inbound requests from tasks 44. Process inbound request logic 58 controls the storage of inbound access requests from tasks 44, in a manner that will be discussed in greater detail below.

Back end 52 incorporates a position queue 60 having a plurality of entries 62 that receive subsets of requests stored in task queue 54, with those requests reordered in the position queue and output in sequence to DASD 42. Position queue 60 is under the control of process outbound request logic 64 that operatively moves requests between task queue 54 and position queue 60, sorts requests stored in position queue 60, and outputs such sorted requests to DASD 42.

As discussed above, scheduling algorithm 48 is implemented within a DASD hardware driver 46 within an operating system 40. Moreover, the handling of inbound and outbound requests is coordinated by separater logic 58, 64.

It will be appreciated, however, that scheduling algorithm 48 may be implemented in other software components in a computer system, including within a specific computer application, within the storage control logic for a DASD, etc. The queues 54, 60 and control logic 58, 64 may also be implemented in hardware and/or software. Further, other data structures may be used to store access requests. Also control logic 58, 64 may be integrated into a single block.

Therefore, the invention is not limited to the particular implementation discussed herein.

Figure 3:
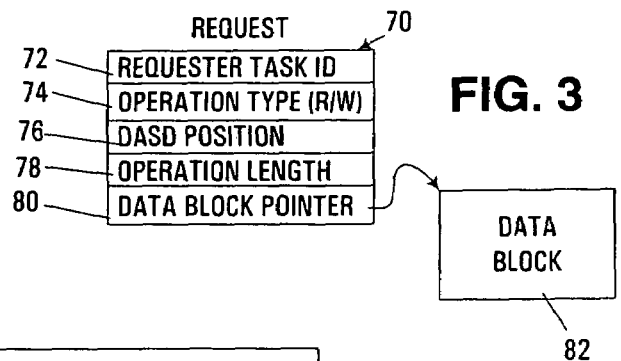
FIG. 3 is a block diagram of an exemplary request data structure for use with the fair elevator scheduling described herein.

FIG. 3 illustrates an exemplary data structure for a request 70 suitable for being processed by a fair elevator algorithm consistent with the invention. Request 70 includes a plurality of fields 72–80 storing various information associated with a request. Field 72 stores a requester task identifier that identifies the particular requester task that has issued the request. Field 74 stores an operation type, e.g., which identifies whether a request is associated with a read or write operation. Field 76 stores a DASD position associated with the location of the data on the DASD to be accessed by the request. Field 78 stores an operation length indicating the amount of data to access on the DASD starting at the DASD position stored in field 76. In addition, field 80 stores a pointer to a data block 82 that stores the actual information to be written to the DASD in a write-type access request or where the information is to be stored for a read access request. It will be appreciated, however, that request 70 may be implemented utilizing any number of alternate data structures, and the invention is not limited to this particular request data format.

Figure 4:
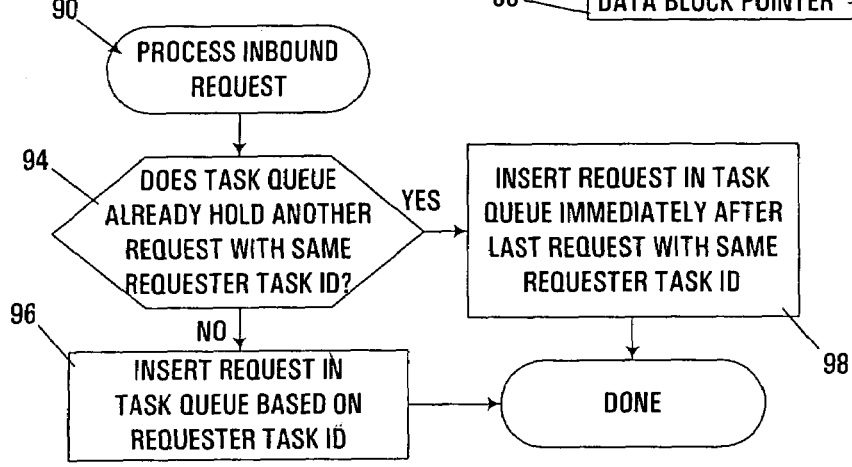
FIG. 4 is a flowchart illustrating a process inbound request routine executed by the scheduling algorithm of FIG. 2.

FIG. 4 illustrates a process inbound request routine 90 executed by control logic 58 of FIG. 2. Routine 90 is initiated in response to the receipt of an inbound request from one of the plurality of requester tasks 44. Starting in block 94, routine 90 first determines whether the task queue already has another request with the same requester task ID as the requester task ID associated with the request.

If the task queue does not store any other request for the same requester, control passes to block 96 to insert the request in the task queue based upon the task ID for the request. Essentially, the request is placed in a relative location in the queue based upon its task ID compared to other requests already stored in the queue.

Returning to block 94, if the task queue already holds another request having the same requester task ID, control instead passes to block 98 to insert the request in the task queue immediately after the last request having the same requester task ID to ensure that the relative ordering of requests from the same requester is maintained. Upon completion of either of blocks 96 and 98, routine 90 is complete.

Figure 5:
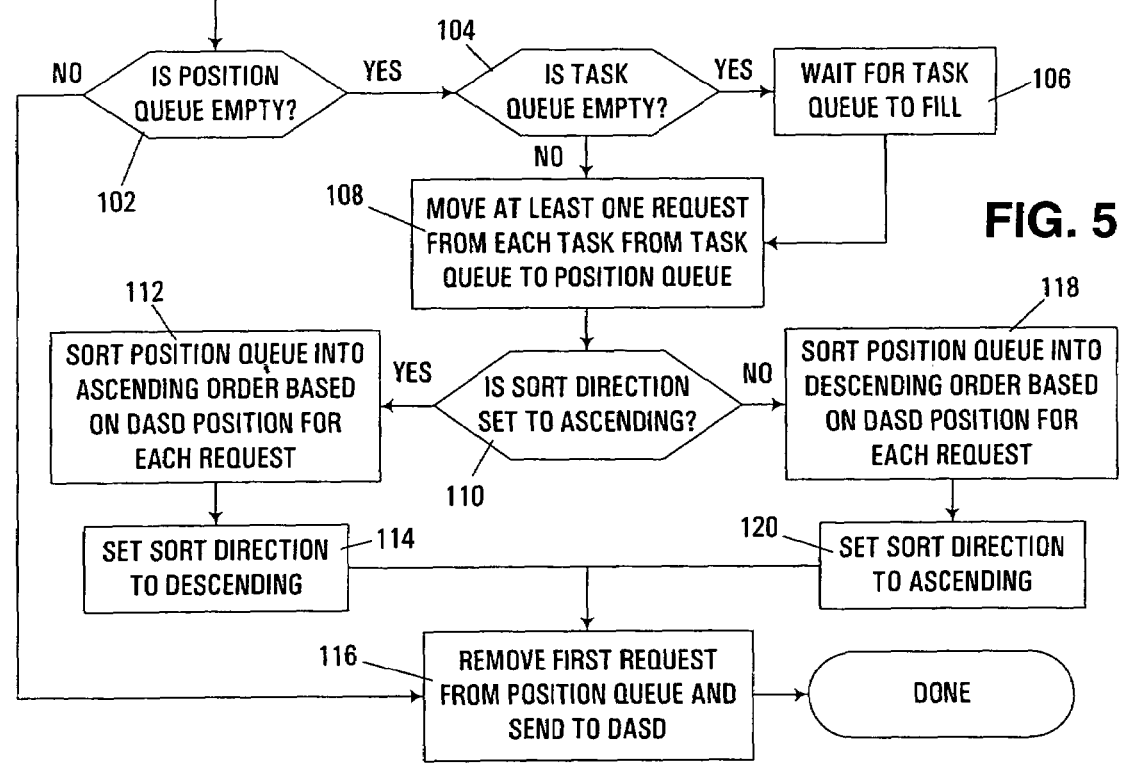
FIG. 5 is a flowchart illustrating the program flow of a process outbound request routine executed by the scheduling algorithm of FIG. 2.

FIG. 5 next illustrates a process outbound requests routine 100 that is invoked when a prior DASD request completes, and a new request needs to be sent to the DASD. Routine 100 typically copies requests stored in task queue 54 over to position queue 60 on an as-needed basis, and resorts the requests based upon DASD positions associated with the requests. Thereafter, requests stored in the position queue are output to the DASD.

In this implementation, routine 100 begins in block 102 by determining whether the position queue is empty. Assuming first that the position queue is initially empty, control next passes to block 104 to determine whether the task queue is empty. If the task queue is empty, control passes to block 106 to wait for the task queue to be filled to full capacity. Control then passes to block 108 to move at least one request from each task from the task queue into the position queue. In addition, returning to block 104, if the task queue is not empty, control is passed directly to block 108. Typically, at least one request from every unique task that has a request stored in the task queue at the time is moved into the position queue in block 108.

Control next passes to block 110 to determine whether the current sort direction for the position queue is set to "ascending" or "descending". In particular, as discussed above, requests are sorted on the position queue to ensure that the read/write head in the DASD can proceed in a back and forth motion between opposing end positions of the device. Thus, assuming that the sort direction is first set to "ascending", block 110 passes control to block 112 to sort the position queue into an ascending order based upon the DASD position stored with each request in the position queue. Control then passes to block 114 to set the sort direction to "descending". Control then passes to block 116 to remove the first request from the position queue and send the request to the DASD as an outbound request. Routine 100 is then complete.

Returning to block 110, if the sort direction is set to "descending", control passes to block 118 to sort the position queue into a descending order based upon the DASD position associated with each request in the position queue. Control then passes to block 120 to set the sort direction to "ascending", and then to block 116 to send the first request in the position queue to the DASD.

Next, returning to block 102, it will be seen that, upon the next opportunity to process an outbound request, block 102 will determine that the position queue is not empty, and control will pass directly to block 116 to remove the first request from the position queue and send the request to the DASD for processing.

It will therefore be appreciated that routine 100 generally operates to process requests in the position queue until all such requests have been removed, and then copy requests from the task queue to the position queue in a batch on an as-needed basis, with the copied requests sorted in an alternating ascending or descending order to minimize seek times in the DASD.

The sizes of the queues, as well as the number of requests that are copied at once between the task and position queues, will affect the relative balance of the "fair" and "elevator" aspects of the fair elevator algorithm. Assuming, for example, that position queue 60 processes n requests at a time, a value of n=1 turns the algorithm into a fair algorithm, with only minimal optimization of seek time in the DASD. When n=∞, however, the algorithm operates in a similar manner to a conventional elevator algorithm, where only seek time is optimized. Thus, the selection of an appropriate value of n, as well as the attendant adjustments to the queue lengths and control logic, can be used to operatively "tune" the performance of the algorithm for different environments. Such tuning may be done at design time or during runtime, and may be determined empirically or mathematically.

To further explain the operation of the illustrated embodiment of the invention, Table I below illustrates an exemplary set of access requests that may be received by a computer system from a plurality of tasks labeled A–E:

TABLE I

EXEMPLARY SET OF ACCESS REQUESTS

| Request No. | Task ID | Operation Type | DASD Position |
|---|---|---|---|
| 1 | A | Read | 101 |
| 2 | A | Read | 102 |
| 3 | A | Read | 103 |
| 4 | B | Write | 80 |
| 5 | C | Read | 930 |
| 6 | C | Write | 513 |
| 7 | C | Read | 933 |
| 8 | C | Write | 514 |
| 9 | D | Read | 333 |
| 10 | D | Read | 881 |
| 11 | E | Write | 731 |
| 12 | E | Write | 732 |
| 13 | E | Write | 733 |
| 14 | E | Write | 734 |

Figure 6A:
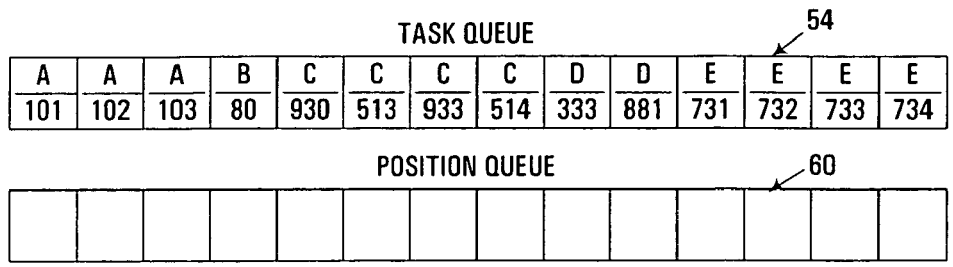
FIGS. 6A–6E illustrate the processing of an exemplary set of access requests using the scheduling algorithm of FIG. 2.
Figure 6B:
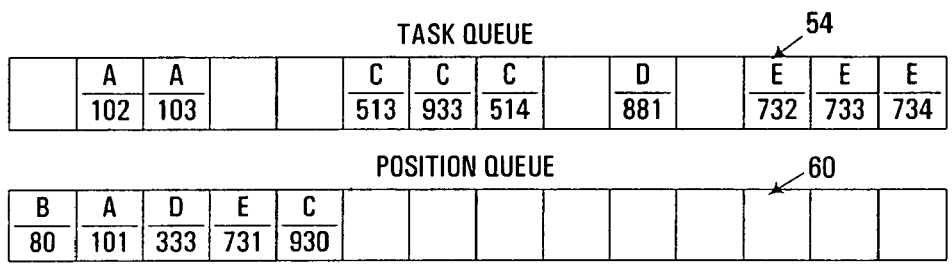

Assuming, for example, that task queue 54 includes enough entries to store each of the fourteen incoming requests, it will be appreciated that process inbound request routine 90 will order the inbound requests into a first ordered set in the manner shown in FIG. 6A, with the requests sorted by task ID with individual requests having the same ID sorted by the order in which they were received.

Assuming first an ascending sort direction, and assuming at most one request from each task ID is processed each pass, upon pass one of DASD 42, routine 100 pulls the first request for each unique task ID onto position queue 60, and sorts such requests in an ascending order to create a second ordered set of requests. Subsequently, each of the requests (B, 80), (A, 101), (D, 333), (E, 731), and (C, 930), (where (x, y) refers to a request having a task ID of x and a DASD position of y), is issued in sequence from position queue 60 resulting in the requests for each of the tasks progressing along with little delay and with minimal seek times.

Figure 6C:
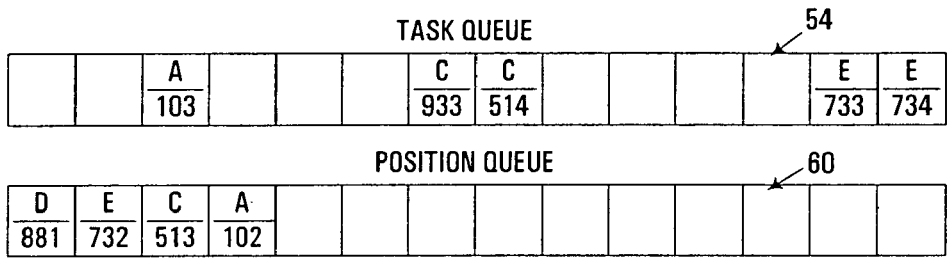

FIG. 6C illustrates the result of a second pass, whereby requests associated with each of tasks A, C, D and E pulled off of task queue 54 and placed on position queue 60, but sorted in a descending manner such that the drive head can return in an opposite direction across the device. Since no pending requests are associated with task B, no task B requests are placed on the position queue.

Figure 6D:
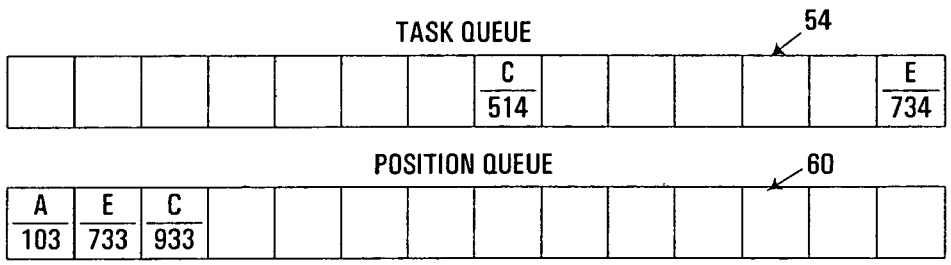
Figure 6E:
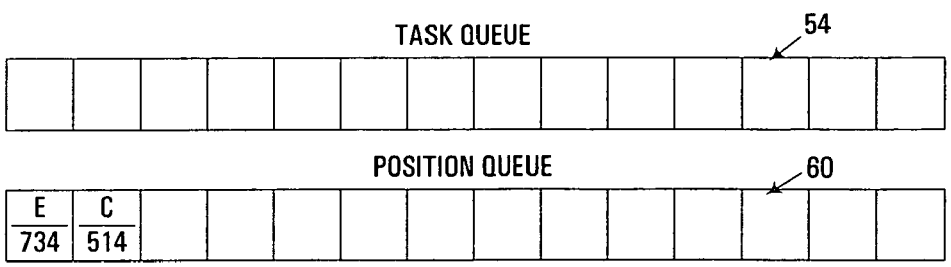

FIGS. 6D and 6E respectively illustrate third and fourth passes of routine 100, wherein the sort direction for position queue 60 is ascending in FIG. 6D and descending in FIG. 6E.

Figure 7:
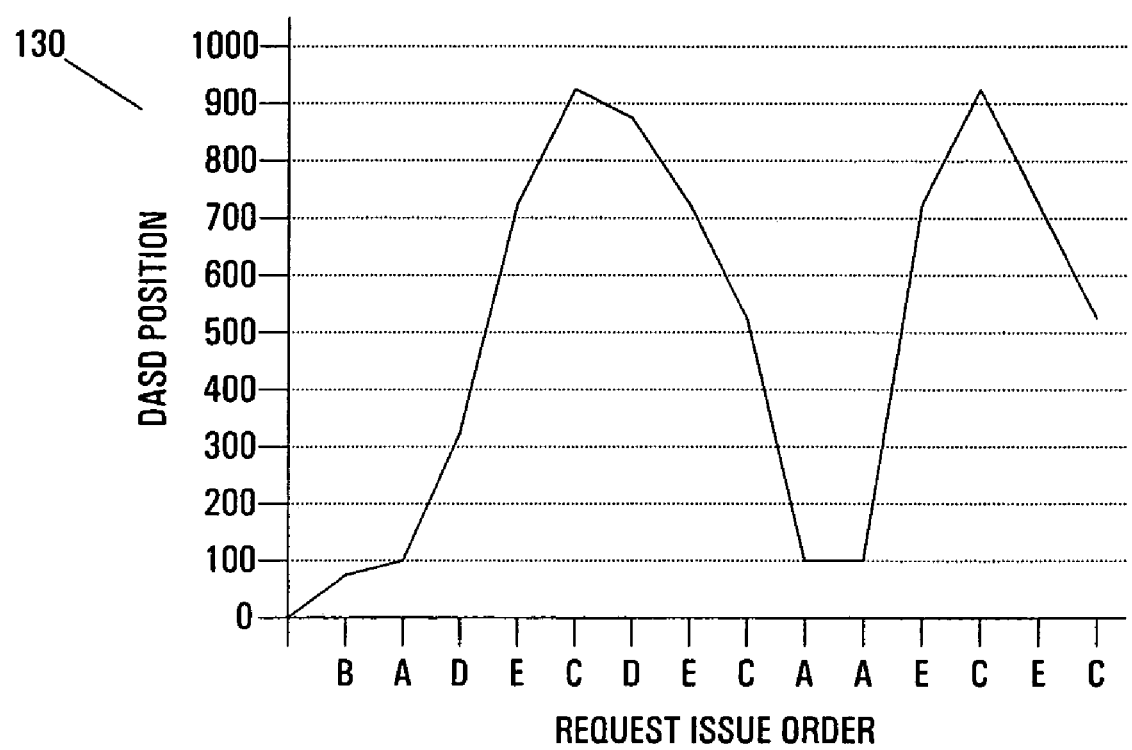
FIG. 7 is a graph of request issue order versus DASD position for the set of access requests shown in FIGS. 6A–6E.

FIG. 7 illustrates in another way the movement of the drive head for DASD 42 when issuing the exemplary requests using the fair elevator scheduling algorithm. The order in which requests are issued, identified by task ID, is shown on one axis of a graph 130, with the other axis showing the relative position on the DASD with which the successively issued requests are associated. It can be seen from the horizontal axis that requests are issued in a relatively fair manner, preventing one task from significantly restricting access to other tasks and requesters in the computer system. On the other hand, as evidenced by the vertical axis, the DASD is capable of sweeping back and forth between end positions with relatively infrequent reversals of direction, thereby minimizing seek times.

Various modifications may be made to the illustrated implementation without departing from the spirit and scope of the invention. For example, rather than copying requests from the task queue to the position queue only when the position queue is empty, the position queue may be filled with new requests when it is determined that the position queue is partially empty, or even on an ongoing basis as new requests are received by the position queue. Moreover, in some implementations, it may be desirable to move multiple requests associated with each task ID from the task queue to the position queue, e.g., to completely fill the position queue during each move operation. In the alternative, only a portion of the position queue may be filled at any given time.

As another additional example, additional factors (e.g., request priority) may also be considered in addition to requester identity and DASD position in a scheduling algorithm consistent with the invention.

Other modifications may be made to the illustrated embodiments without departing from the spirit and scope of the invention. Therefore, the invention lies in the claims hereinafter appended.

What is claimed is:

1. A method of processing access requests for a direct access storage device (DASD), each access request associated with a requester and a position on the DASD, the method comprising:
   (a) sorting at least a subset of a plurality of access requests directed to the DASD based upon the requesters associated therewith to generate a first ordered set of access requests;
   (b) sorting at least a subset of the access requests in the first ordered set of access requests based upon the positions associated therewith to generate a second ordered set of access requests; and
   (c) issuing each of the access requests in the second ordered set of access requests in sequence to the DASD.

2. The method of claim 1, further comprising moving access requests between a first queue and a second queue, wherein sorting the access requests to generate the first ordered set of access requests includes receiving inbound access requests into the first queue, and sorting the access requests received into the first queue based upon the requesters associated therewith, wherein sorting the access requests in the first ordered set includes sorting access requests moved into the second queue based upon the positions associated therewith, and wherein issuing the access requests in the second ordered set includes removing issued access requests from the second queue.

3. The method of claim 2, wherein sorting the access requests received into the first queue includes, for each inbound access request:
   (a) determining whether another access request in the first queue is associated with the same requester as the inbound access request;
   (b) if so, storing the inbound access request after a last access request associated with the same requester as the inbound access request; and
   (c) if not, arranging the inbound access request within the first queue based upon a requester identifier associated therewith.

4. The method of claim 3, wherein moving access requests between the first queue and the second queue is performed in response to determining that the second queue is empty.

5. The method of claim 4, wherein moving access requests between the first queue and the second queue includes, for each requester associated with an access request stored in the first queue, moving at least one access request associated with such requester into the second queue.

6. The method of claim 2, wherein moving access requests between the first queue and the second queue further includes moving a batch of access requests between the first queue and second queue, and wherein sorting the access requests moved into the second queue includes reversing a sort order for each successive batch of access requests.

7. The method of claim 1, wherein sorting the access requests in the first ordered set includes alternately sorting access requests in ascending and descending order.

8. The method of claim 1, wherein each access request is associated with one of a plurality of requesters in a computer coupled to the DASD, with each requester being a computer task executing on the computer.

9. A method of processing access requests for a direct access storage device (DASD), each access request associated with a requester and a position on the DASD, the method comprising:
   (a) sorting a plurality of access requests directed to the DASD based upon both the requesters and the positions associated therewith; and
   (b) issuing the sorted access requests to the DASD.

10. The method of claim 9, wherein sorting the plurality of access requests includes:
    (a) sorting at least a subset of a plurality of access requests based upon the requesters associated therewith to generate a first ordered set of access requests; and
    (b) sorting at least a subset of the access requests in the first ordered set of access requests based upon the positions associated therewith to generate a second ordered set of access requests, wherein issuing the sorted access requests includes issuing each of the access requests in the second ordered set of access requests in sequence to the DASD.

11. The method of claim 9, wherein sorting the plurality of access requests includes:
    (a) sorting at least a subset of a plurality of access requests using one of a fair scheduling algorithm and an elevator scheduling algorithm to generate a first ordered set of access requests; and
    (b) sorting at least a subset of the access requests in the first ordered set of access requests using the other of the fair scheduling algorithm and the elevator scheduling algorithm.

12. A method of processing access requests for a direct access storage device (DASD), each access request associated with a requester and a position on the DASD, the method comprising:
    (a) receiving incoming access requests into a first queue that is sorted based upon the requester associated with each access request stored in the first queue;
    (b) moving at least one access request from the first queue to a second queue that is sorted based upon the position associated with each access request stored in the second queue; and
    (c) sequentially issuing access requests from the second queue to the DASD.

13. An apparatus for use in processing access requests for a direct access storage device (DASD), each access request associated with a requester and a position on the DASD, the apparatus comprising:
    (a) a memory; and
    (b) a program, resident in the memory, the program configured to sort a plurality of access requests directed to the DASD based upon both the requesters and the positions associated therewith, and issue the sorted access requests to the DASD.

14. The apparatus of claim 13, wherein the program is configured to sort the plurality of access requests by sorting at least a subset of a plurality of access requests using one of a fair scheduling algorithm and an elevator scheduling algorithm to generate a first ordered set of access requests; and sorting at least a subset of the access requests in the first ordered set of access requests using the other of the fair scheduling algorithm and the elevator scheduling algorithm.

15. The apparatus of claim 13, wherein the program is configured to sort the plurality of access requests by sorting at least a subset of a plurality of access requests based upon the requesters associated therewith to generate a first ordered set of access requests, and sorting at least a subset of the access requests in the first ordered set of access requests based upon the positions associated therewith to generate a second ordered set of access requests, and wherein the program is configured to issue the sorted access requests by issuing each of the access requests in the second ordered set of access requests in sequence to the DASD.

16. The apparatus of claim 15, wherein the program is further configured to:
    (a) move access requests between a first queue and a second queue;
    (b) sort the access requests to generate the first ordered set of access requests by receiving inbound access requests into the first queue and sorting the access requests received into the first queue based upon the requesters associated therewith;
    (c) sort the access requests in the first ordered set by sorting access requests moved into the second queue based upon the positions associated therewith; and
    (d) issue the access requests in the second ordered set by removing issued access requests from the second queue.

17. The apparatus of claim 16, wherein the program is configured to sort the access requests received into the first queue by, for each inbound access request:
    (a) determining whether another access request in the first queue is associated with the same requester as the inbound access request;

(b) if so, storing the inbound access request after a last access request associated with the same requester as the inbound access request; and (c) if not, arranging the inbound access request within the first queue based upon a requester identifier associated therewith.

18. The apparatus of claim 17, wherein the program is configured to move access requests between the first queue and the second queue in response to determining that the second queue is empty.

19. The apparatus of claim 18, wherein the program is configured to move access requests between the first queue and the second queue by, for each requester associated with an access request stored in the first queue, moving at least one access request associated with such requester into the second queue.

20. The apparatus of claim 16, wherein the program is configured to move access requests between the first queue and the second queue by moving a batch of access requests between the first queue and second queue, and wherein the program is configured to sort the access requests moved into the second queue by reversing a sort order for each successive batch of access requests.

21. The apparatus of claim 15, wherein the program is configured to sort the access requests in the first ordered set by alternately sorting access requests in ascending and descending order.

22. The apparatus of claim 15, further comprising a plurality of requester computer tasks resident in the memory, wherein each access request is associated with one of the plurality of requester computer tasks.

23. An apparatus for use in processing access requests for a direct access storage device (DASD), each access request associated with a requester and a position on the DASD, the apparatus comprising:

(a) a first queue configured to receive incoming access requests, the access requests in the first queue sorted based upon the requesters associated therewith;

(b) a second queue configured to issue outgoing access requests to the DASD, the access requests in the second queue sorted based upon the positions associated therewith; and (c) control logic coupled to the first and second queues and configured to selectively move access requests from the first queue to the second queue.

24. The apparatus of claim 23, further comprising a memory; and a processor coupled to the memory, wherein the control logic comprises request processing program code resident in the memory.

25. The apparatus of claim 24, further comprising an operating system resident in the memory, wherein the request processing program code and the first and second queues are resident in the operating system.

26. The apparatus of claim 25, wherein the operating system includes a DASD hardware driver that interfaces the apparatus with the DASD, and wherein the request processing program code and the first and second queues are resident in the DASD hardware driver.

27. The apparatus of claim 24, wherein the first and second queues are resident in the memory.

28. A program product, comprising:

(a) a program for use in processing access requests for a direct access storage device (DASD), each access request associated with a requester and a position on the DASD, the program configured to sort a plurality of access requests directed to the DASD based upon both the requesters and the positions associated therewith, and issue the sorted access requests to the DASD; and (b) a signal bearing medium bearing the program.

29. The program product of claim 28, wherein the signal bearing medium includes at least one of a recordable medium and a transmission type medium.

* * * * *